(12) United States Patent
Achard

(10) Patent No.: US 10,844,834 B2
(45) Date of Patent: Nov. 24, 2020

(54) FLOATING WIND TURBINE HAVING TWIN VERTICAL-AXIS TURBINES WITH IMPROVED EFFICIENCY

(71) Applicant: CENTRE NATIONAL DE LA RECHERCHE SCIENTIFIQUE, Paris (FR)

(72) Inventor: Jean-Luc Achard, Grenoble (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 106 days.

(21) Appl. No.: 16/083,630

(22) PCT Filed: Mar. 7, 2017

(86) PCT No.: PCT/FR2017/050505
§ 371 (c)(1),
(2) Date: Sep. 10, 2018

(87) PCT Pub. No.: WO2017/153676
PCT Pub. Date: Sep. 14, 2017

(65) Prior Publication Data
US 2019/0128241 A1    May 2, 2019

(30) Foreign Application Priority Data
Mar. 8, 2016  (FR) ...................................... 16 51913

(51) Int. Cl.
*F03D 9/25* (2016.01)
*F03D 3/00* (2006.01)
(Continued)

(52) U.S. Cl.
CPC ............... *F03D 3/005* (2013.01); *F03D 3/02* (2013.01); *F03D 3/04* (2013.01); *F03D 3/062* (2013.01);
(Continued)

(58) Field of Classification Search
None
See application file for complete search history.

(56) References Cited

U.S. PATENT DOCUMENTS 7,075,189 B2 * 7/2006 Heronemus ............. B63B 1/047
   290/44
8,827,631 B2   9/2014 Achard et al.
(Continued)

FOREIGN PATENT DOCUMENTS

| WO | WO 2009/036107 | 3/2009 |
| WO | WO 2010/120182 | 10/2010 |
| WO | WO 2013/175123 | 11/2013 |

OTHER PUBLICATIONS

International Search Report, PCT/FR2017/050505, dated May 8, 2017.

*Primary Examiner* — Michael Lebentritt
(74) *Attorney, Agent, or Firm* — Nixon & Vanderhye

(57) ABSTRACT

Disclosed is a floating wind turbine including a floating platform and a turbomachine resting on the platform, the turbomachine including: —first and second transverse flow turbines disposed symmetrically with respect to a first plane, each turbine including blades including central parts that are extended at the ends by arms, connected to shaft elements by pivoting connections, each turbine also including upper and lower fairings; and—a structure for holding the turbines including a vertical median pylon between the turbines and upstream of a second plane containing the axes of rotation of the blades of the turbines.

25 Claims, 4 Drawing Sheets

(51) Int. Cl.
- *F03D 3/02* (2006.01)
- *F03D 3/06* (2006.01)
- *F03D 9/00* (2016.01)
- *F03D 3/04* (2006.01)
- *F03D 9/30* (2016.01)
- *H02K 7/102* (2006.01)
- *H02K 7/18* (2006.01)
- *H02K 21/14* (2006.01)
- *F03D 13/25* (2016.01)
- *F03D 17/00* (2016.01)

(52) U.S. Cl.
CPC ............ *F03D 3/064* (2013.01); *F03D 3/065* (2013.01); *F03D 9/007* (2013.01); *F03D 9/25* (2016.05); *F03D 9/30* (2016.05); *H02K 7/102* (2013.01); *H02K 7/183* (2013.01); *H02K 21/14* (2013.01); *F03D 13/25* (2016.05); *F03D 17/00* (2016.05); *F05B 2240/211* (2013.01); *F05B 2240/93* (2013.01); *F05B 2240/95* (2013.01); *F05B 2260/90* (2013.01); *F05B 2270/329* (2013.01); *Y02E 10/74* (2013.01)

(56) References Cited

U.S. PATENT DOCUMENTS

| | | | |
|---|---|---|---|
| 2010/0133851 A1* | 6/2010 | Devitt | C23C 4/04 290/55 |
| 2010/0278653 A1* | 11/2010 | Sassow | F03D 3/061 416/223 R |
| 2011/0200436 A1* | 8/2011 | Wu | F03D 3/005 416/170 R |
| 2011/0236181 A1 | 9/2011 | Wygnanski | |
| 2012/0128500 A1* | 5/2012 | Perless | F03D 3/061 416/223 R |
| 2013/0276687 A1* | 10/2013 | Roddier | B63B 1/107 114/121 |
| 2014/0105743 A1* | 4/2014 | Bassett | F03D 3/0463 416/126 |
| 2014/0322012 A1* | 10/2014 | Steinberg | F03D 3/067 416/17 |
| 2015/0337807 A1* | 11/2015 | Ting | F03D 9/25 290/44 |
| 2016/0075413 A1* | 3/2016 | Nebrera Garcia | E02D 27/42 114/122 |
| 2016/0123300 A1* | 5/2016 | Tamatsu | F03D 15/10 415/13 |
| 2016/0340000 A1* | 11/2016 | Dagher | B63B 5/18 |
| 2017/0159645 A1* | 6/2017 | Qin | F03D 3/005 |
| 2018/0030962 A1* | 2/2018 | Bodanese | F03D 13/25 |
| 2018/0105235 A1* | 4/2018 | Zou | F03D 13/25 |
| 2018/0171986 A1 | 6/2018 | Ehrnberg | F03D 3/005 |
| 2019/0257286 A1* | 8/2019 | Li | F03D 3/005 |

* cited by examiner

FLOATING WIND TURBINE HAVING TWIN VERTICAL-AXIS TURBINES WITH IMPROVED EFFICIENCY

The present patent application claims priority to French patent application FR16/51913, which will be considered as forming an integral part of the present description.

FIELD

The present invention relates to a floating wind turbine, in particular for use offshore.

DESCRIPTION OF THE PRIOR ART

Most of the wind turbines installed on dry land comprise axial flow turbines generally including three blades, the axis of rotation of which is parallel to the direction of the incident wind that reaches the wind turbine. These wind turbines are called HAWT (Horizontal-Axis Wind Turbine). The blades are borne by a nacelle at the upper end of a tower. The other land-based wind turbines comprise cross-flow turbines the axis of rotation of which is perpendicular to the wind direction, arranged horizontally and most often vertically, and called VAWT (Vertical-Axis Wind Turbine). The blades of the wind turbines drive a shaft in rotation which in turn drives an electric generator (also called a generator).

A current tendency is for the installation of wind turbines offshore, as the wind is more intense and more constant there. The offshore wind turbines that are currently active essentially comprise axial-flow turbines. The lower end of the tower bearing the axial-flow turbine is fixed to the sea bed at depths of less than 50-60 m, using various systems suitable for the nature of the soil. However, there are a limited number of sites with shallow depth and it is therefore desirable to design marine wind turbines, called floating wind turbines, including a floating support structure that is connected to the sea bed by an anchoring system.

Many proposed designs for floating wind turbines use HAWT. This choice is reassuring as it provides continuity with the solutions adopted for land-based or installed offshore wind turbines. It can however be challenged, as HAWTs appear to be not very suitable for offshore floating wind turbines for several reasons. One of the reasons is that the nacelle, which contains the power transmission components (optionally with a gearbox acting as a speed-increasing gear set), the generator and the control room, is placed at the top of the tower. The high position of the nacelle perched at the top of the tower (compared with the VAWT where the contents of the nacelle are housed close to the surface of the water or even underwater) means that (a) maintenance is difficult at sea as a result of difficult access (b) compensation for pitch and roll by the platform to achieve vertical stability is more difficult, as a result of the significant weight of the heavy components, the generator and the speed-increasing gear set, and (c) installation is more difficult, requiring large-size cranes.

Moreover, HAWT require additional adjustments such as (d) aerodynamic adjustment for yaw, the servo mechanism for which is also perched at the upper end of the tower, connected with the nacelle, while the VAWT are insensitive to wind direction, and (e) thermal regulation (generator, speed-increasing gear set) in the nacelle; this function may be critical as a result of the significant temperature variations at this height at sea, far from the stabilizing influence of the water. Finally, (f) the blades of the HAWT are subject to cyclic gravitational load stress resulting from the increase in their weight with the increase in power of the floating wind turbines. This increase results from optimization of the costs of this type of wind turbine. Thus scaling difficulties at the design stage result therefrom.

It appears more advantageous to develop floating wind turbines using VAWT than HAWT. Numerous examples of VAWT have been described. Among these examples, the vertical turbines of the Savonius type, classified with the VAWT, but operating on a principle of differential drag between opposite blades, are not considered herein as due to their very low output they are incompatible with floating wind turbine projects for which the power levels must be very high in order to justify the costs of installation and maintenance. On the other hand, VAWTs of a second type operate on a principle of lift on a single blade and are divided into Darrieus turbines with troposkein-shaped blades, or turbines with straight or helicoidal blades in an H configuration, or V-shaped. By way of example, document WO2009/036107 describes a floating VAWT including a Darrieus turbine and document WO2010/120182 describes a floating VAWT composed of an H-type turbine with straight blades.

However, a number of drawbacks of the VAWTs of the second type still exist, some of which have led to their failure on land, and must be removed or reduced:

(i) It is accepted that the power produced by VAWTs of the second type, although higher than that of the VAWTs of the first type, remains lower than the power produced by HAWTs of the same size. Several solutions have been tried in order to reduce this drawback. H turbines in fact suffer from dissipative losses that are manifest at the arm-blade connections and at foil ends. The optimum efficiency is then generally not very high. Said efficiency can then be increased a little by reducing the drag with profiled blade-arm connections using moulded composite material and especially by installing a device for adjusting the angle of attack. Said device introduces mechanical complexity, in the harsh marine environment where maintenance must be limited. On the other hand, the optimum efficiency of the Darrieus turbines is clearly higher thanks to a reduced (below 0.3) solidity $S=2Nc/D$ (where N is the number of blades, c is the chord and D/2 is the radius of the turbine) and a high optimum advance parameter $\lambda=\omega D/2V_i$ ($\omega$ being the angular speed of rotation of the turbine and $V_i$ being the incident wind speed) (greater than 4). The power harvested, proportional to the maximum section of the turbine, is low unless this maximum section is increased. This involves greatly increasing the height of the tower, which is a severe handicap for machines that are held by guys.

(ii) Starting can become difficult, with the blades remaining immobile in given angular positions.

(iii) The tangential and normal aerodynamic forces on each blade during each revolution of the turbine are pulsating. They are transmitted along the linking arms and then onto the drive shaft of the turbine. At the foot of this drive shaft, an oscillating bending moment due in particular to the normal component of the forces results therefrom, which leads to significant fatigue on the structures. This moment has two components:

a first component that tends to make the wind turbine lean from front to back or vice-versa, parallel to the wind direction, and called "back-and-forth" bending moment; and a second component that tends to make the wind turbine lean from left to right or vice-versa, in a plane perpendicular to the wind direction, and called "side-to-side" moment.

It is known that the juxtaposition of twin counter-rotating turbines makes it possible to define turbine engines that remove or reduce drawbacks (i) (ii) and (iii). The majority of such turbine engines designed firstly for land-based applications are equipped with VAWT of the first type, and a few are equipped with VAWT of the second type. Conversely, a disadvantage of the juxtaposition of twin turbines is the loss of the insensitivity of the single VAWTs to the incident wind direction: yaw adjustment becomes necessary. Document U.S. Pat. No. 8,827,631 may be mentioned, which describes a marine turbine with turbines of the second type and document WO2013/175123, which describes a wind turbine with turbines of this second type flanked by lateral fairings and held by a central upright, components that use a substantial quantity of material; the aerodynamic adjustment equipment with which the turbine is equipped also being bulky. It is therefore unable to follow the power increase of floating wind turbines.

It would therefore be desirable to propose a floating wind turbine comprising twin turbines that reduces, or even removes, some of the aforementioned faults while being economical with respect to material.

Moreover, as the floating wind turbines are remote from the shore, the solutions envisaged must remain simple in order to limit costly interventions.

SUMMARY

A subject of an embodiment is to overcome all or part of the aforementioned drawbacks of the floating wind turbines formed by twin turbines.

Another subject of an embodiment is to increase the efficiency of such wind turbines without using too much material.

Another subject of an embodiment is to smooth the variations in the normal loads exerted on the pivot linkages of the turbines during their rotation.

Another subject of an embodiment is to provide the windward orientation of the wind turbine passively, by means of the architecture of the wind turbine, so that no yaw control is necessary.

Thus, an embodiment provides for a floating wind turbine comprising a floating platform and a turbine engine resting on the platform, the turbine engine comprising:
  first and second cross-flow turbines arranged symmetrically with respect to a first plane, each turbine composed of blades comprising central parts and arms, the central parts describing cylinders in rotation and being extended at the ends by the arms, the arms being moreover linked to axle elements by pivot linkages, each turbine being held by two horizontal fairings, upper and lower, equipped with a support structure, not comprising a shaft;
  a structure for bearing the turbines composed of a system formed by said upper and lower fairings linked to a vertical median pylon between the turbines and upstream with respect to the wind direction of a second plane containing the axes of rotation of the blades of the turbines.

According to an embodiment, the turbine engine is suitable for pivoting with respect to the floating platform about a pivot axis situated upstream of the second plane with respect to the wind direction.

According to an embodiment, the arms are perpendicular to the axes of rotation of the blades.

According to an embodiment, the central part of each blade is linked to each corresponding arm by a quarter-circle elbow portion.

According to an embodiment, the central part of each blade is straight.

According to an embodiment, the central part of each blade has a deflection with a small angle of inclination (<5°) while remaining inscribed within the cylinder described by the turbine during its rotation.

According to an embodiment, for each blade, the height of the central part of the blade measured parallel to the axis of rotation of the blade is greater than or equal to ⅔ of the height, measured parallel to the axis of rotation of the blade, between the two arms linked to the central part of the blade.

The horizontal fairings are:
  either equipped with a first class of support structure, the whole then being called a MMESS fairing (Moderately Material Efficient Supporting Structure) making it possible to house and to shelter the arms from the incident wind, the axle elements and the hubs being housed entirely inside the fairings. According to an embodiment, each MMESS fairing comprises a housing partially closed by a cowl fixed to the axle element of the fairing, an annular opening being left between the edge of the cowl and the rest of the fairing for the blades of the turbine to pass through. According to an embodiment, each MMESS fairing houses a fraction, varying between one half and the whole, of the elbow portions of the blades of the turbine. Thus said fairing has a breadth that can vary from the diameter of the turbine to a fraction thereof, in relation to the fraction of the elbow part that it houses. According to an embodiment, the MMESS fairings are also linked to a vertical stabilizer strut in the first median plane downstream of the second plane with respect to the wind direction; or
  the horizontal fairings are equipped with a second class of support structure, the assembly then being called an HMESS fairing (Highly Material Efficient Supporting Structure) leaving the arms open to the incident wind; the axle elements and the hubs being partially housed inside the fairings. Each HMESS fairing is formed by a half-foil (straight, swept, trapezoidal, elliptical, etc.) at the end and within which is arranged a pivot linkage comprising a rotating hub extending outside the half-foil and on which the blades of the turbine are attached externally via a rotating disk forming a single piece with the hub. Said half-foil has a breadth that extends just beyond the elements of the pivot linkage.

According to an embodiment, each MMESS fairing of the floating wind turbine also comprises, for each turbine, a vertical lateral strut on the side of the turbine opposite the first plane and linking the upper and lower fairings of the turbine.

According to an embodiment, each MMESS fairing comprises an annular tube linked by a first structural tube to the median pylon and by a second structural tube to the vertical stabilizer strut.

According to an embodiment, each HMESS fairing comprises an elongated annular structural tube in function of the breadth of each half-foil and close to the leading edge linking the median pylon to the pivot linkage.

According to an embodiment, each turbine comprises a diagonal traction line that links each blade, from a point situated within the upper half of the blade, to a rotating component of the upper pivot linkage of the turbine and a second diagonal traction line that links each blade, from a point situated within the lower half of the blade, to a rotating component of the lower pivot linkage of the turbine.

According to an embodiment, each turbine comprises a horizontal traction line linking each blade of the turbine to the other blades of the turbine via a common node placed on the axis of rotation of the turbine at a height situated near to halfway along the blade.

According to an embodiment, each turbine comprises an electric generator driven by the blades of the turbine and housed in the lower fairing of the turbine.

According to an embodiment, the generator is a direct-driven permanent magnet synchronous generator.

According to an embodiment, the generator comprises a disk brake.

According to an embodiment, cables for evacuation of the electricity produced by the generator and/or for monitoring and/or controlling the generator and/or the disk brake are arranged in the annular structural tube of the lower fairing of the turbine.

According to an embodiment, the annular structural tubes of the upper and lower fairings of the turbine are suitable for a maintenance agent to pass through.

According to an embodiment, the floating wind turbine also comprises at least one photovoltaic panel fixed to the upper face of one of the upper fairings.

BRIEF DESCRIPTION OF THE DRAWINGS

These characteristics and advantages, as well as others, will be disclosed in detail in the following description of particular embodiments given non-limitatively with reference to the attached figures, among which.

DETAILED DESCRIPTION

Only the elements useful for understanding the invention are described and shown in the figures. In the remainder of the description, unless otherwise stated, the expressions "approximately", "substantially" and "of the order of" mean plus or minus 10%, preferably plus or minus 5%. Moreover, the terms "upper", "lower", "above", "below", "top" and "base" are defined with respect to the axis of rotation of the turbines of the wind turbine, which corresponds for example substantially to the vertical direction.

Figure 1:
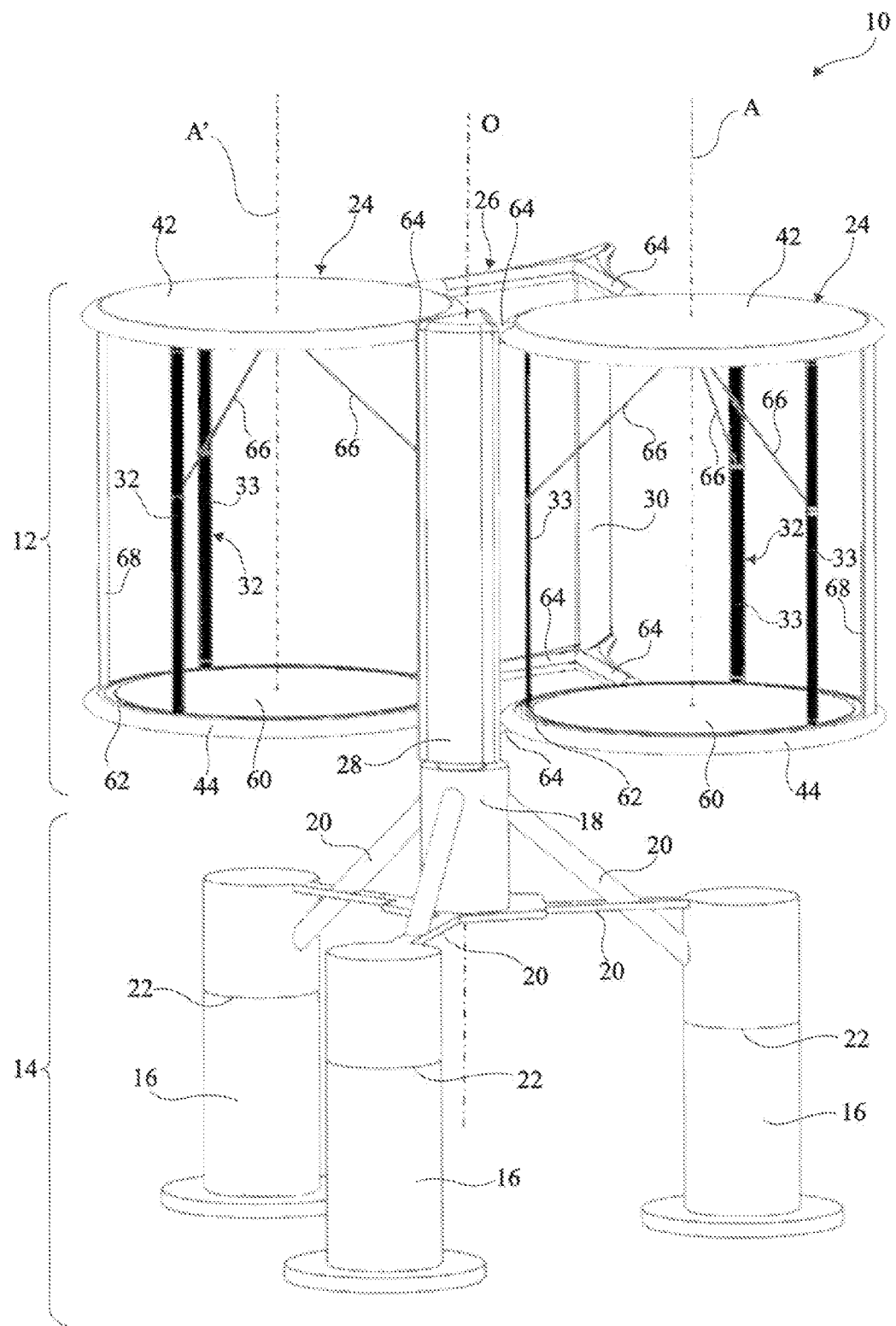
FIG. 1 is a partial diagrammatic perspective view of an embodiment of a floating wind turbine with MMESS fairings.

FIG. 1 is a partial diagrammatic perspective view of an embodiment of a floating wind turbine 10 with MMESS fairings. The floating wind turbine 10 comprises a turbine engine 12 above water level resting on a floating platform 14.

The turbine engine 12 comprises two juxtaposed cross-flow turbines 24 with axes of rotation A and A', each held by an upper and lower MMESS fairing 42, 44, with a bearing structure 26, having the shape of a flattened ellipsoid of revolution around said axes of rotation, said fairings being equipped with support structures (shown in FIG. 2) that are linked to the median pylon 28 by structural tubes 64 and to the vertical stabilizer strut 30 by structural tubes 64, said pylon and said vertical stabilizer strut being contained in a median vertical plane on either side of which the two turbines 24 are placed symmetrically. The cross section of the vertical stabilizer strut, in a plane perpendicular to the axes of rotation of the turbines 24, is a symmetrical foil profile.

Figure 2A:
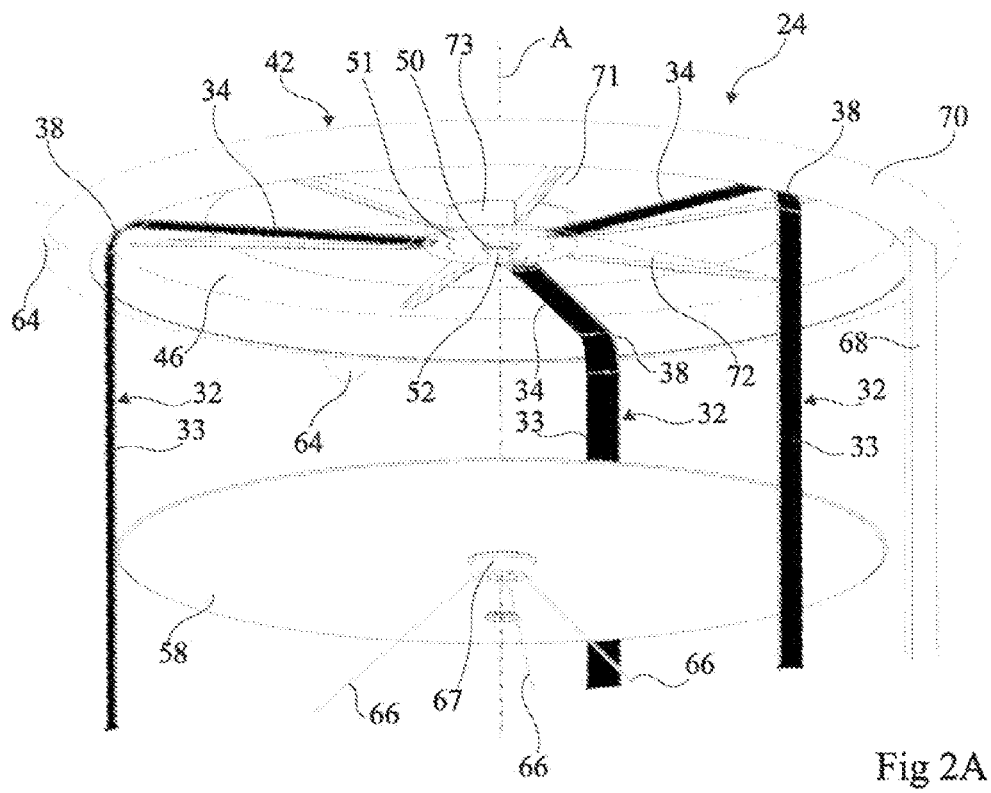
FIGS. 2A and 2B are partial diagrammatic exploded views, respectively of the upper part and of the lower part of one of the turbines shown in FIG. 1.
Figure 2B:
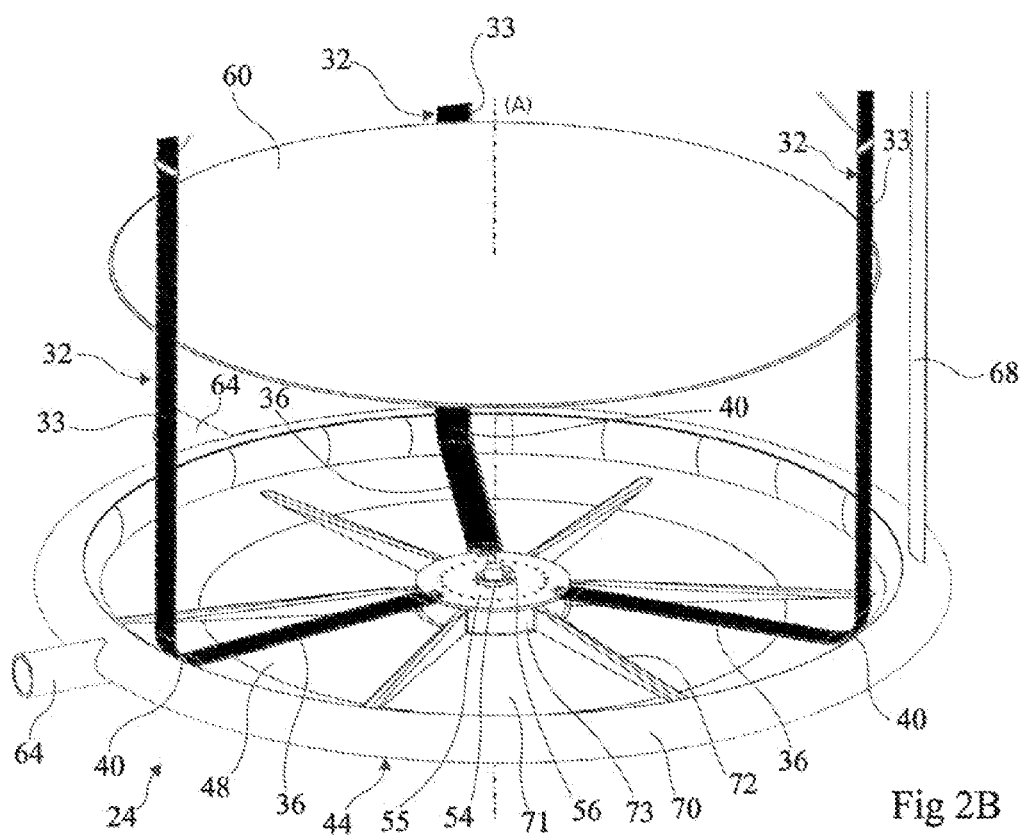
Figure 3A:
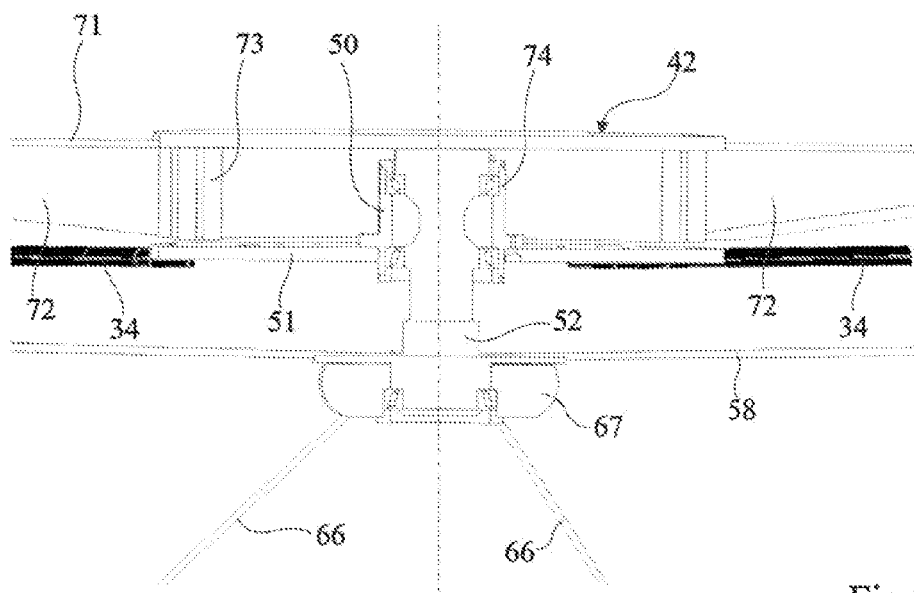
FIGS. 3A and 3B are enlarged partial diagrammatic cross section views of the upper part and of the lower part of one of the turbines shown in FIG. 1.
Figure 3B:
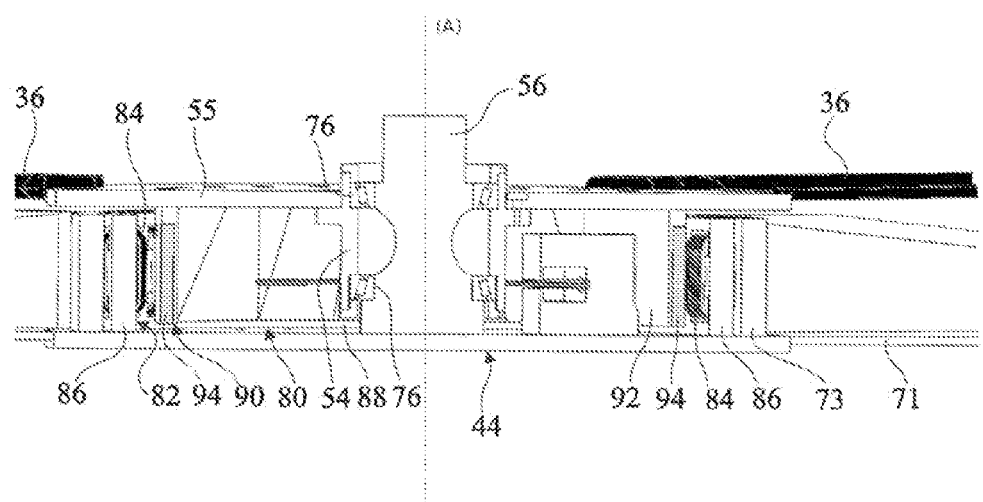

In this way, it becomes possible to bear the blades 32 of the turbines with axis A and A' by a pivot linkage fixed to the upper and lower MMESS fairings 42, 44 that will be detailed in FIGS. 2, 3A and 3B. Thus each turbine 24 can dispense with a shaft, as in the cross-flow turbines described above. The bearing function is thus provided by the median pylon 28 and the vertical stabilizer strut 30. This makes it possible to decouple the two hubs of one and the same turbine allowing misalignment between these two hubs without producing parasitic bending stresses originating from the upper pivot linkage towards the lower pivot linkage. In particular, this makes it possible to avoid the impact of the bending moments originating from the upper pivot linkage towards the lower pivot linkage.

According to an embodiment, the pylon 28 has a substantially triangular cross section that is symmetrical with respect to the median plane, with an upstream surface in an arc of a circle and two flat or concave lateral faces meeting downstream towards a vanishing line contained in the median plane. In its upstream part this pylon is connected to the floating support by a cylindrical tower with axis O and its extension at depth has at most one half of the diameter of the turbine. According to an embodiment, the angle between the plane containing the axes A and A' and the plane containing the axis A and tangent to the pylon 28, on the upstream side according to the wind direction, is less than or equal to 30°.

The swept shape of the pylon in the wind direction is inversely proportional to the quadratic moment along the pitch axis of the turbine engine. Now, due to its extension at depth, the moment of this pylon is much greater than that of a circular tower of the same maximum section. Thus the pylon is capable of better absorbing the longitudinal aerodynamic and mechanical instationary stresses that are transmitted thereto via the pivot linkages of the turbines.

According to an embodiment, each turbine 24 comprises blades 32, which are at least two in number, and by way of example three in number in FIG. 1. The blades 32 for the turbine 24 shown on the right in FIG. 1 are mounted mobile in rotation about the axis A and the blades of the turbine 24 shown on the left in FIG. 1 are mounted mobile in rotation about the axis A'. Preferably, the axes A and A' are parallel. In movement, the blades 32 sweep surfaces inscribed within cylinders of revolution of diameter D and respectively with axis A for the turbine 24 shown on the right in FIG. 1 and A' for the turbine 24 shown on the left in FIG. 1. Each blade 32 comprises a central portion 33 that is contained within the cylinder of diameter D. By way of example, the central portion 33 is straight and parallel to the axis A or A'. In this figure only the central portion 33 is exposed to the wind but other embodiments of the MMESS fairings can be envisaged as will be described hereinafter.

The blades 32 have profiles symmetrically distributed on these cylinders with respect to the median plane that separates the cylinders. They thus have an opposite direction of rotation, this direction being such that the blades 32 move upwind in the median section.

In a plane perpendicular to the axis of rotation A or A', the cross section of each blade 32 can correspond to a profile of the hollow symmetrical or asymmetrical biconvex type, or with double curvature. According to an embodiment, the diameter D is comprised between 20 m and 80 m.

In the embodiment shown in FIG. 1, the blades 32 of each turbine 24 have a straight central part 33 but any type of blades originating from cross-flow turbines can be used, providing that the central part 33 of the blade 32 sweeps a cylinder of revolution. By way of example, the turbine can be equipped with blades the central part of which is helical or blades the central part of which is V-shaped, such as described in patent US 2011006534, the sweep of which however cannot exceed 10° so as not to cause a sharp decline in efficiency. The use of the helical blades or the V-shaped blades has the advantage of making the torque supplied by the blades uniform.

The platform 14 can be semi-submersible, and correspond to a three-float platform. The platform 14 comprises three flotation columns or cylinders 16 arranged in a star-shape. The platform 14 also comprises a central tower 18, with axis O, linked to the flotation cylinders 16 by trusses 20. The platform 14 is stabilized so that the axes A and A' of the turbines are close to the vertical position, providing the maximum harvested power, not only by the hydrostatic stiffness due to the three flotation columns 16 in the shape of a star but also by the ballast, which can be a liquid ballast, placed in the lower part of the columns. The distribution of liquid in these columns can be controlled so that no appreciable change of attitude takes place. The platform 14 is held in place by an anchoring system (not shown), comprising for example catenaries, connected to the sea bed. An advantage of the three-float platform 14 is its satisfactory compromise between the cost of raw materials, the cost of installation and the performance at sea. Other types of floating platforms can be used. According to a variant, the platform 14 can correspond to the platform described in document WO2013/175124, which is considered as forming an integral part of the present description. According to a variant, the platform 14 can also correspond to a barge, a "spar" platform, or a tension-leg platform (TLP). The water level is shown diagrammatically by the lines 22 in FIG. 1.

Preferably, the turbine engine 12 is mounted on the central tower 18 of the platform 14. According to a variant, a pivot linkage system, not shown in FIG. 1, can be provided at the top of the tower 18 in order to leave the turbine engine 12 in free rotation with respect to the floating platform 14 about the substantially vertical axis O. To this end the pylon 28 can be extended by a cylindrical portion with axis O that acts as the male part of the pivot linkage and that enters a cylindrical opening with axis O provided in the tower 18, that acts as the female part of the pivot linkage. This linkage can be provided by a variant of a slew ring that is found at the top of HAWT towers and that contains a large roller bearing.

This pivot linkage allows the turbine engine to orient itself to windward. In fact the resultants of the normal forces exerted by each turbine on the pivot linkages borne by the MMESS fairings 42, 44 balance out, in the same way as for the moments that they create on the axis O because the positioning of the axes A and A' downstream of the axis of rotation O in fact tend to stabilize the wind turbine at each instant to windward, without starting rotation.

The vertical stabilizer strut 30, present in wind turbines with MMESS fairings, contributes to maintaining the axis of symmetry of the turbine engine 12 parallel to the wind direction in normal operation. In fact, the vertical stabilizer strut 30 acts as a tail vane with substantial leverage. In conclusion, advantageously, no yaw control is necessary.

In a simplified embodiment where a link system at the top of the tower 18 is not provided, yaw stabilization of the wind turbine remains advisable. The platform floating support 14 shown in FIG. 1 is subject to this correcting aerodynamic moment, which is added to that of the catenaries that control the yaw of this type of floating support.

FIGS. 2A and 2B are partial diagrammatic exploded views, respectively of the upper part and of the lower part of the turbine 24 shown on the right in FIG. 1. The turbines 24 have structures that are symmetrical with one another with respect to a median plane. A more detailed description of the turbine 24 shown on the right in FIG. 1 will now be given, in the knowledge that the turbine shown on the left in FIG. 1 has a symmetrical structure.

Each blade 32 comprises an upper arm 34, preferably substantially perpendicular to the axis A or A', in particular horizontal, and linked to the upper end of the central part 33 of the blade 32 and a lower arm 36, preferably substantially perpendicular to the axis A or A', in particular horizontal, and linked to the lower end of the central part 33 of the blade 32. According to an embodiment, for each blade 32, an upper elbow 38, preferably having substantially the shape of a quarter-circle of radius R, links the central part of each blade 32 to the upper arm 34 and a lower elbow 40, preferably having substantially the shape of a quarter-circle of radius R, links the central part 33 of each blade 32 to the lower arm 36. The length L of each arm 34, 36 measured from the axis A is such that R+L=D/2. From the aerodynamic point of view alone, the value of R results from a compromise intended to maximize the power produced by a turbine. Generally, for said turbine operating in an infinite medium, a low R increases the surface area swept by the driving part 33 but raises the interference drag, thus the associated dissipation source. An optimum is sought for each specific turbine geometry (N, c, D, etc.). An upper limit of R is ⅙ of the distance, measured parallel to the axis A, between the arms 34 and 36 linked to the central part 33 of the blade 32 or in other words the height measured parallel to the axis A of the central part 33 of each blade 32 is greater than or equal to ⅔ of this distance.

The upper arms 32 are connected to an upper hub 50, via a disk 51 pierced and fixed to the hub 50. The upper hub 50 is mounted rotatably via bearings or bushes shown in FIGS. 3A and 3B, about an upper vertical guide axle element 52 with axis A, the upper axle element 52 being fixed to the upper inside face of the upper fairing 42. The lower arms 36 are connected to a lower hub 54, via a disk 55 pierced and fixed to the hub 54. The lower hub 54 is mounted rotatably via bearings or bushes, not shown in these figures, about a lower vertical guide axle element 56 with axis A, the axle element 56 being fixed on the lower inside face of the lower fairing 42.

The arms 34, 36 and the elbows 38, 40 have a profiled shape, which can be different to that of the central parts 33 of the blades 32 in order to bear the increase in the shear stresses exerted there. The maximum thickness of the cross section of the arms 34, 36 of each blade 32 can be greater than the maximum thickness of the cross section of the central part 33 of the blade 32, for example greater than or equal to double the maximum thickness of the cross section of the central part 33 of the blade 32.

According to an embodiment, the profile of each elbow portion 38, 40 provides a monotonic transition from the characteristics of the profile of the central part of the blade to which the elbow portion is linked to the characteristics of the profile of the arm to which the elbow portion is linked.

Each blade 32 can be produced from a composite material using carbon fibres. Taking account of the uniformity of the stresses undergone with respect to the central part, production of the blades in identical panels can be developed according to said part. Production in panels can also be undertaken for the upper and lower arms, the upper and lower elbows also being produced separately. These panels can then be connected on site with wing joiner and pocket systems in order to reconstitute the blade, reducing the costs of logistics and installation. Finally, the straight panels of the blades can be produced at a low cost according to the pultrusion process.

The turbine 24 that has just been described, shown on the right in FIG. 1, is linked to the lower and upper MMESS fairings. Despite covering only the geometry of the turbine blades, the description could equally well be that of the blades of a turbine linked to HMESS fairings corresponding to another embodiment such as described in FIG. 4 and all the characteristics of the blades of this turbine given above remain valid.

According to an embodiment, at the top of each turbine 24, the upper arms 34 and the elbows 38 are housed within a housing 46 provided in the MESS upper fairing 42 of revolution. At the base of each turbine 24, the arms 36 and the elbows 40 are housed within a housing 48 provided in the lower fairing 44 of revolution.

Each MMESS fairing 42, 44 comprises a tube 70 that runs along the edge of a substantially flat plate 71. The tube 70 is linked to the structural tube 64 that meets the median pylon 28 upstream and to the structural tube 64 that meets the vertical stabilizer strut 30 downstream. Each fairing 42, 44 also comprises a set of reinforcing ribs 72 that radiate from a cylindrical part 73 with axis A, the cylindrical part, the ribs 72 and the tube 70 forming a single piece with the plate 71.

According to an embodiment, the upper MMESS fairing 42 of the turbine 24 with axis A also comprises a circular cowl 58 with axis A that covers the housing 46 and is fixed without the possibility of rotation on the lower end of the upper element 52 of the vertical guide shaft. An annular opening, not shown in FIG. 1, the width e of which is from three to five times the thickness of the central parts 33 of the blades 32 and the radius equal to D/2, is arranged between the edge of the housing 46 and the cowl 58 in order to allow the upper end of the central part 33 of each blade 32 to enter the housing 46 and to connect to the upper hub 50 via the elbow 38 and the arm 34. The diameter Dp of the cowl 58 is equal to D-e.

The lower MMESS fairing 44 of the turbine 24 with axis A also comprises a circular cowl 60 with axis A that covers the housing 48 and is fixed without the possibility of rotation on the upper end of the lower element 56 of the vertical guide shaft. An annular opening 62, shown in FIG. 1, the width e of which is from three to five times the thickness of the central parts 33 of the blades 32 and the radius equal to D/2, is arranged between the edge of the housing 48 and the cowl 60 in order to allow the lower end of the central part 33 of each blade 32 to enter the housing 48 and connect to the lower hub 50 via the elbow 38 and the arm 34. The diameter Dp of the cowl 60 is equal to D-e.

The turbine 24 with axis A is thus deployed along this axis in three zones, a median zone between the two fairings, upper and lower 42, 44 in which the central parts 33 of the blades 32, which are situated on a cylinder of diameter D, are subject to the incident wind and are driving, and two zones in the upper and lower fairings 42, 44 that enclose the arms 34, 36 as well as the hubs 50, 54. In the two latter zones, the arms 34, 36 undergo profile drag and have no drive effect on the operation of the turbine 24. However, this drag on these components results only from a pure rotational movement in this closed space, because said components escape the flow component associated with the incident wind that would increase the drag in the absence of the MMESS fairings 42, 44. This proposition holds to the extent that the horizontal arms 34 are sufficiently distant from the upper and lower faces of each upper 42 and lower fairing. In addition, the upper MMESS fairing 42 equipped with its cowl 58 and the lower MMESS fairing 44 equipped with its cowl 60 adopt, for each blade 32 and at each angular position of the blade 32 during one revolution, the role that would be played by two large straight end winglets at the ends of an aeroplane wing, and reduces the wing-end drag, as apparent in the Darrieus H- or helical turbines.

According to another embodiment, it can be advantageous nevertheless for the value of the diameter of the cowl 58, 60 to be less than D-e for structural reasons, as producing a cowl 58, 60 of large dimensions that remains stable in operation for large-size wind turbines can be difficult. A fraction, for example up to one half of the elbows can be open to the wind without thereby increasing the interference drag. The advantage is to reduce the diameter of the upper and lower MMESS fairings and of the associated cowls.

Finally, the pylon provides four aerodynamic functions:
(i) The rounded front face of the pylon 28 shelters the upwind movement of the blades 32, a zone in which they are slowed down, and thereby improves their performance.
(ii) By its presence, the pylon makes the overall flow around each turbine asymmetric with respect to a plane parallel to the incident flow and passing through the axis of rotation. Now, the symmetry of this flow for a vertical turbine in an infinite medium at least at start-up results in difficulty in starting, the blades remaining immobilized in given symmetrical angular positions.
(iii) It has been shown how the positioning and the geometry of this pylon contributes in various ways to the windward stabilization of the wind turbine and thus its yaw control, particularly as will be mentioned, during the use of HMESS fairings.
(iv) It has also been mentioned that the blades 32 of the turbine with axis A are borne by a pivot linkage between the upper and lower MMESS fairings 42, 44, themselves held by the supporting median pylon 28. FIG. 2 details this point by showing how the blades pivot independently about upper 52 and lower 56 axle elements and make it possible for each turbine 24 to dispense with a shaft. The absence of a central shaft, ultimately resulting from the support function being carried out by the median pylon 28, also prevents vortices, in particular von Kármán vortex streets systems, disturbing the blades 32 during their passage within the downstream half-disk in the course of their rotation about the axis A. In addition, the frequency of these systems (dimensionless parameter $V_i/a$, where a is the diameter of the shaft, and then called Strouhal frequency), would pose problems as, with increasing $V_i$, it nears the natural frequency of a tower. These problems are thus eliminated.

Each MMESS fairing 42, 44 can also adopt the role of a foil with a pitch-down moment contribution.

In addition, running through the structural tubes 64 are all the electrical monitoring/control circuits of the components in the generator casing such as the disk brake, electric cable for the evacuation of the harvested power, and a possibility of access for the maintenance agents inside the fairings through specific access ways (not shown) outside the fairings. A control cabinet managing the functions of the wind turbine by means of various electrical devices and programmable logic controllers can be installed at the foot of the median pylon 28 and/or at the foot of the tower 18.

According to an embodiment, for each blade 32, a diagonal antideflection traction line 66 links an annular part 67, pivotably mounted by a specific bearing or bush about the lower end of the upper vertical guide element 52 to the blade 32 at a height situated within the upper half thereof and a diagonal antideflection traction line (not shown) links an annular part pivotably mounted by a specific bearing or bush about the upper end of the lower vertical guide axle element 56 to the blade 32, at a height situated within the upper half thereof. The traction line 66 can correspond to a cable, a rope, a chain, a profile, etc. These two lines, suitably distributed over the central portion 33 in order to make the deformation of the blade uniform in a radial direction, make it possible on the one hand with the lower cable to counter the centrifugal forces that are preponderant with respect to the aerodynamic forces (lift and drag) in nominal operation and on the other hand with the upper cable to maintain the horizontality of the arms 34, 36 of the turbine 24 with axis A that tends to sag under the influence of gravity each time the turbine stops.

Finally, for each turbine 24, profiled external vertical lateral struts 68 advantageously link the MMESS fairings 42, 44 of the turbine 24 on the side of the turbine 24 opposite to the median plane.

The median pylon 28, the vertical stabilizer strut 30, the lateral struts 68 and the fairings 42, 44 can be produced from materials used in aeronautics for the production of wings, for example composite materials.

FIGS. 3A and 3B are enlarged partial diagrammatic cross section views of the upper part and of the lower part respectively of a floating wind turbine 10 with MMESS fairings from one of the turbines 24 shown in FIG. 1.

As shown in FIG. 3A, the upper fairing 42 contains a pivot linkage 74 linking the upper hub 50 to the upper axle element 52. By way of example, the pivot linkage 74 is formed by bearings.

As shown in FIG. 3B, the lower fairing 44 contains a pivot linkage 76 linking the lower hub 54 to the lower axle element 56. By way of example, the pivot linkage 76 is formed by bearings. The lower fairing 44 also contains the generator 80 that evacuates the mechanical power supplied by the turbine 24. According to an embodiment, the generator 80 is a direct-driven permanent magnet synchronous generator. The stator 82 of the generator 80 comprises a winding 84 arranged on a support 86 placed in an enclosure 88 delimited by the plate 71, the cylindrical part 73 and the disk 55. The rotor 90 of the generator 80 comprises a cylindrical part 92 with axis A fixed to the disk 55 forming a single piece with the hub 54 and equipped with permanent magnets 94 that are placed facing the winding 84. The rotor 90 can also comprise reinforcing ribs 95. The flow exchanged between the rotor 90 and the stator 82 is thus radial. The direct-driven permanent magnet synchronous generator 80 has the advantage of being able to operate at variable speed, not requiring a speed-increasing gear set, which would occupy space in the lower fairing 44, increasing its thickness, and of having a high power-to-weight ratio. The generator 80 must be equipped with a disk brake 96 comprising a disk 97 forming a single piece with the rotor 55 and a calliper 98 fixed to the lower fairing 44.

Figure 4:
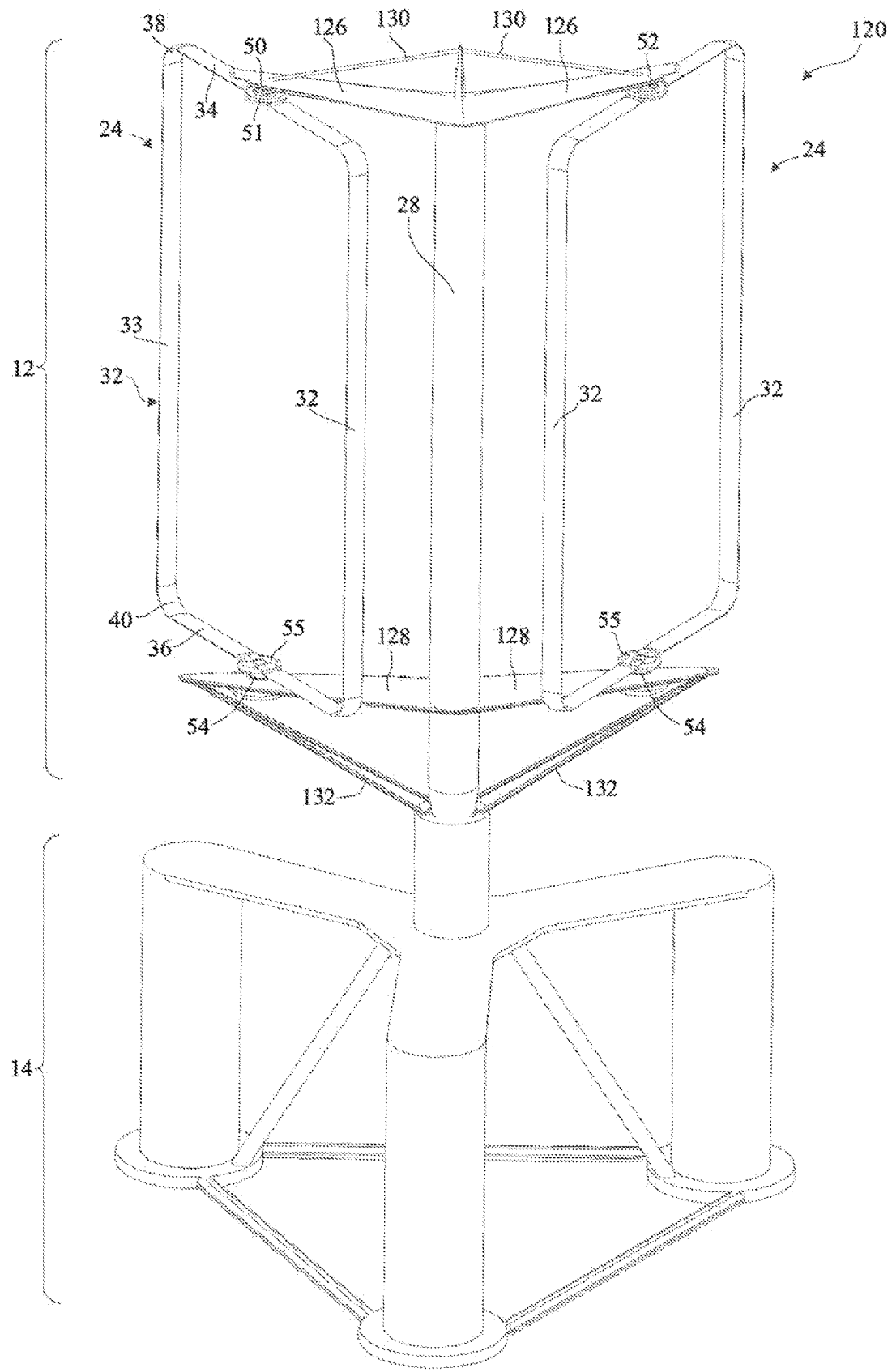
FIG. 4 is a partial diagrammatic perspective view of a floating wind turbine with MMESS fairings.

FIG. 4 is a partial diagrammatic perspective view of an embodiment of a floating wind turbine 120 with upper 126 and lower 128 MMESS fairings. The floating wind turbine 120 comprises all of the elements of the floating wind turbine 10 shown in FIG. 1, with the difference that for each turbine 24, the upper 42 or lower 44 MMESS fairing is replaced by an upper 126 or lower 128 support structure with a reduced space requirement, called HMESS fairing. In addition, the vertical stabilizer strut 30 is absent.

Each upper 126 or lower 128 HMESS fairing comprises a half-foil (straight, swept, trapezoid, elliptical, etc.) linked to the pylon 28, at the end of which a pivot linkage is arranged (not shown) for the turbines 24. The upper 126 and lower 128 HMESS fairings comprise upper and lower axle elements respectively (not shown). Upper 50 and lower 54 hubs (partially shown) are rotatably mounted, by means of bearings or bushes that are not shown in this figure, on said upper and lower axle elements respectively, a circular opening being left for the extensions of said hubs outside the HMESS fairings. Upper 51 and lower 55 external disks, fixed to the external parts of said hubs 50, 54 are driven by the arms 34 and 36 of the blades 32 of the turbine of which they form an integral part.

In this embodiment, the lower 126 and upper 128 HMESS fairings provide certain common functions (and derive therefrom the subsequent advantages) with those of the MMESS fairings shown in FIGS. 2A and 2B. Firstly, the support function is partially provided by elongated annular structural tubes (not shown) in function of the breadth of each half-foil, close to the leading edge and linked to the median pylon. The support function is then provided by conventional means (not shown) used in aeroplane wings: spars parallel to these tubes, ribs and internal cables.

For the upper fairing 126, in addition to the internal cables, external cables of a guying system 130 can be added, as shown in FIG. 4, linking from the top of the vertical bars at the apex of the pylon 28 to the axle elements of the half-foils and, for the lower fairing 128, external supporting bars 132 linking from the bottom of the pylon 28 to the axle elements of the half-foils.

Thus, with respect to the lower and upper HMESS fairings, the annular structural tubes offer a possibility of access for the maintenance agents to the components for the transmission of mechanical power produced by the blades within and outside the fairings. Finally, with respect to the lower HMESS fairings only, said tubes in addition give said maintenance agents an access to the monitoring/control electrical circuits of the components within the casing of the generator such as the disk brake and the electric cable for the evacuation of the harvested power.

Finally, there is no need for a drive shaft with the shared structural and aerodynamic advantages with the MMESS fairings.

The HMESS fairings, for which elbows 38, 40 and arms 34, 36 of the blades 32 remain external to the fairings, leave to the shape itself of the blades 32 the function of reducing the parasitic drags. The arms 34, 36 that are no longer sheltered can undergo a more intense drag than with an MMESS fairing. On the other hand, the assembly formed by an elbow 38, 40 at the end of the active part 33 of a blade 32 that is extended by an upper and lower arm 34, 36 perpendicular to the axis A can itself be compared to a winglet having a surface area less than that of an MMESS fairing. The interference drag can also be reduced with HMESS fairings by adjusting the radius of curvature of the elbow 38, 40. The absence of a central shaft also prevents vortices, in particular von/Carman vortex street systems, disturbing the blades 32 during their passage through the downstream half-disk in the course of their rotation about the axis A. In conclusion, the advantages in respect of reducing parasitic drags obtained in the presence of HMESS fairings and MMESS fairings remain overall substantial and comparable.

These advantages have a significant impact on the power values supplied by the turbines 24 supported by these two types of fairings equipped with support structure. In fact it becomes possible, by means of the general architecture of the wind turbine common to both types of fairings, to bear the turbines by their top and bottom ends, without encroaching upon their zone of rotation, the common pylon 28 supporting the fairings being outside these zones, and thus advantageously combining the characteristics of the two main variants of VAWT operating on the principle of the forces of lift. From the Darrieus turbines, is taken their efficiency resulting from a reduced solidity S and their high optimal advance ratio A, and from the H-turbines, a maximum section considerably greater than that of the Darrieus turbines for a given height, originating from their rectangular shape, maintained in particular by traction lines.

According to an embodiment, in order to counter the centrifugal and gravitational forces, it is always possible, as in FIG. 1, to use a diagonal antideflection traction line 66 (not shown in this FIG. 4) that links an annular part similar to the part 67 shown in FIG. 2, but fixed around the centre of the external upper disk 51 to the blade 32 at a fastening point situated within the upper half of the blade. Advantageously, a second diagonal traction line (not shown) can link an annular part fixed around the centre of the external lower disk 55 to the blade 32 at a fastening point situated within the lower half of the blade 32. It should be noted that the HMESS fairings offer a method of fastening onto the pivot linkage that is different from that described above for MMESS fairings. For the latter, the disk being internal, it was therefore necessary to introduce an additional bearing around the external element alone, with the lower end of the upper fixed vertical axle element 52 supporting the cowl.

According to an embodiment, in order to counter the centrifugal forces only, it is also possible to introduce antideflection traction lines, linking a point situated close to the middle of the blades 32 to a point situated on the axis of rotation, in a horizontal plane. For a turbine with two blades, such as shown in FIG. 4, these deflection lines are reduced to a single line. Conversely, this solution can be used in the presence of MMESS fairings.

According to an embodiment, each traction line 68 or each traction line 66 in FIG. 1, with its complement on the lower half of the blade 32, can comprise a cable covered with a profiled sleeve, the sleeve extending substantially over the entire length of the cable with the exception of the zones where the cable is in contact with the blades 32. The sleeve can be made from polymer. It can have the form of a symmetrical profile.

No yaw control is necessary in the embodiment in which a system is provided for linking to the top of the tower 18 described above. The resultants of the normal forces exerted by each turbine 24 on the pivot linkages borne by the HMESS fairings 126, 128 balance out, the same as for the moments that they create at O. The positioning of the axes A and A' downstream of the axis of rotation O tend to stabilize the wind turbine to windward at each instant, without starting rotation. The advantageously extended pylon 28 in the wind turbines 120 with the HMESS fairings, reaching for example one half of the diameter of a turbine, further accentuates this windward stabilization. In fact, the action of the wind that is exerted on the lateral surface of the pylon that is (i) more exposed to the wind (ii) and arranged mainly downstream of the axis O of the pylon 28, acts as a tail vane. For a third reason, the turbine 24 that is the most exposed to the wind, with the pylon 28, jointly shelters the least exposed turbine 24. The overall drag exerted by the wind on the first turbine 24 is greater than the overall drag on the second turbine 24 and the resulting estimated torque at the foot of the pylon 28 is also a correcting torque.

In the embodiment in which said system of linking to the top of the tower 18 is not provided, the platform floating support 14 shown in FIG. 1 is subject to this correcting aerodynamic moment, which is added to that of the catenaries that control the yaw of this floating support and contribute to holding the axis of symmetry of the turbine engine 12 parallel with the wind direction under normal operation.

According to the embodiment shown in FIG. 4, the turbine is equipped with two blades. This choice is very favourable for stabilizing the turbine following an emergency stop: to this end it is necessary to halt both turbines in an angular configuration in which their two blades remain in a plane containing the axes of rotation of the blades of the turbines, a configuration for which the driving forces are minimum, or even negative.

Various embodiments with different variants have been described above. It will be noted that a person skilled in the art may combine various elements of these various embodiments and variants without demonstrating inventive step.

The invention claimed is:

1. A floating wind turbine (10) comprising a floating platform (14) and a turbine engine (12) resting on the platform, the turbine engine comprising:
   first and second vertical-axis turbines (24) arranged symmetrically with respect to a first plane, each turbine comprising a number N of blades (32) equal to or greater than two comprising central parts (33) and profiled arms (34, 36), axes of rotation (A, A') of the blades of the turbines being contained in a second plane perpendicular to the first plane,
   the central parts of the blades in rotation forming cylinders around the axes (A, A') and being extended at ends thereof by the arms, the arms also being linked to axle elements (52, 56) by pivot linkages (74, 76), the arms (34, 36) being perpendicular to the axes of rotation (A, A') of the blades (32), the central part (33) of each blade (32) being linked to each arm (34, 36) via a profiled elbow portion (38, 40),
   wherein, for each blade (32), a height of the central part (33) of the blade measured parallel to the axis of rotation (A, A') of the blade, is greater than or equal to ⅔ of a height, measured parallel to the axis of rotation (A, A') of the blade, between the two arms (34, 36) linked to the central part of the blade, and
   wherein each turbine is supported by upper and lower horizontal fairings (42, 44; 126, 128) equipped with support structure and not comprising a shaft linking the axle elements together,
   a structure for bearing the turbines composed comprising said upper and lower horizontal fairings equipped with support structures, linked to a vertical median pylon (28) between the turbines.

2. The floating wind turbine according to claim 1, wherein a radius of curvature of each elbow portion (38, 40) at any point deviates by less than 5% from a radius of one quarter-circle.

3. The floating wind turbine according the claim 1, wherein the profile of each elbow portion (38, 40) provides a monotonic transition from characteristics of the profile of the central part of the blade to which the elbow portion is linked, to characteristics of the profile of the arm to which the elbow portion is linked.

4. The floating wind turbine according to claim 1, wherein the upper and lower horizontal fairings of each turbine are linked to a vertical median pylon between the turbines having a substantially triangular cross section that is symmetrical with respect to the median plane, with an upstream surface with respect to wind direction in an arc of a circle and two flat or concave lateral faces meeting downstream towards a vanishing line contained in the median plane,
- wherein an upstream part of the pylon is connected to the floating support by a substantially cylindrical tower with axis O placed upstream of the second plane containing the axes of rotation of the blades of the turbines.

5. The floating wind turbine according to claim 1, wherein each turbine (24) comprises a diagonal traction line (66) that links each blade (32), from a point situated within an upper half of the blade, to a component of an upper pivot linkage of the turbine and a second diagonal traction line that links each blade (32), from a point situated within a lower half of the blade, to a rotating component of a lower pivot linkage of the turbine.

6. The floating wind turbine according to claim 1, wherein each turbine (24) comprises a horizontal traction line that links each blade (32) of the turbine to other blades of the turbine via a common node placed on the axis of rotation of the turbine at a height situated near to halfway along the blade.

7. The floating wind turbine according to claim 5, wherein each traction line is covered with a profiled sleeve, the sleeve extending substantially over the entire length of the traction line except for zones where the traction line is in contact with the blades (32).

8. The floating wind turbine according to claim 1, wherein when rotating, the central parts of the blades (32) form cylinders of diameter D and have solidity $S=2Nc/D$ less than 0.2, c being the chord of the profiles of the blades.

9. The floating wind turbine according to claim 1, wherein the pylon (28) is extended by a cylindrical portion with axis O that forms a male part of the pivot linkage and that enters a cylindrical opening with axis O provided in a tower (18) that forms a female part of a pivot linkage by means of which the turbine engine (12) pivots with respect to the floating platform (14).

10. The floating wind turbine according to claim 1, wherein each horizontal fairing (42, 44; 126, 128) is equipped with an upper and lower support structure formed by a half-foil at the end and within which is arranged a pivot linkage comprising a fixed axle element, a rotating hub (50, 54) extending outside the half-foil and on which the arms (34, 36) of the blades (32) of the turbine (24) are attached externally via a disk (51, 55).

11. The floating wind turbine according to claim 10, wherein the support structure of each fairing (42, 44; 126, 128) comprises spars, ribs, and cables internal to the fairing, and an elongated annular structural tube in function of the breadth of each half-foil, close to the leading edge and linked to the pylon (28).

12. The floating wind turbine according to claim 11,
- wherein for the upper fairing, external traction lines of a guying system are provided that link from the supports at the apex of the pylon to the axle elements of the half-foils, and
- wherein for the lower fairing, external supporting bars are provided that link the pylon to the axle elements of the half-foils.

13. The floating wind turbine according to claim 11, wherein the annular structural tube is configured for a maintenance agent to pass through.

14. The floating wind turbine according to claim 1, wherein each upper and lower horizontal fairing (42, 44; 126, 128) equipped with a support structure is formed by a flattened ellipsoid of revolution at a centre housing and sheltering from the wind a pivot linkage, comprising a fixed axle element (52, 56) fixed inside the fairing, and a hub (50, 54) that rotates about said axle element,
- the arms (34, 36) of the blades (32) of the turbine (24) connected to a rotating disk (51, 55) forming a single piece with the rotating hub and a fraction, varying between one half and the whole, of the elbow portions (38, 40) of the blades of the turbine.

15. The floating wind turbine according to claim 14, wherein each fairing (42, 44) of the turbine comprises a housing (46, 48) partially closed by a cowl (58, 60) fixed to the axle element (52, 56) of the fairing, an annular opening (62) being between the edge of the cowl and a remainder of the fairing configured for the blades (32) of the turbine to pass through.

16. Wind turbine according to claim 14, wherein the bearing structure (26) comprises a vertical stabilizer strut (30) in the first median plane downstream of the second plane with respect to the wind direction.

17. The floating wind turbine according to claim 14, wherein the support structure of each fairing (42, 44) comprises an annular tube (70) linked by a first structural tube (64) to the median pylon (28) and by a second structural tube (64) to the vertical stabilizer strut (30).

18. The floating wind turbine according to claim 17, wherein the first structural tube (64) is configured for a maintenance agent to pass through.

19. The floating wind turbine according to claim 17, wherein each turbine (24) comprises an electric generator (80) driven by the blades (32) of the turbine housed in or under the lower horizontal fairing equipped with the support structure thereof.

20. The floating wind turbine according to claim 19, wherein the generator (80) is a direct-driven permanent magnet synchronous generator.

21. The floating wind turbine according to claim 19, wherein the generator (80) comprises a disk brake (96).

22. The floating wind turbine according to claim 19, wherein cables for evacuation of the electricity produced by the generator (80) and/or for monitoring and/or controlling the generator (80) and/or the disk brake are arranged in the structural tubes (64).

23. The floating wind turbine according to claim 1, wherein each blade (32) is produced from a composite material using carbon fibres.

24. The floating wind turbine according to claim 1, wherein each blade (32) is formed of panels, the central part, the upper and lower arms, with the upper and lower elbows being formed separately.

25. The floating wind turbine according to claim 24, wherein the panels are connected together on site in order to reconstitute the foil.

\* \* \* \* \*